United States Patent [19]

Malamud et al.

[11] Patent Number: 5,678,014
[45] Date of Patent: Oct. 14, 1997

[54] FOLDER RACK ICONS

[75] Inventors: Mark A. Malamud, Seattle; John E. Elsbree, Everett; Erik A. Gavriluk, Seattle; David E. McCauley, III; Steve Madigan, both of Redmond; Joyce A. Grauman; David A. Barnes, both of Seattle, all of Wash.

[73] Assignee: Microsoft Corporation, Redmond, Wash.

[21] Appl. No.: 626,650

[22] Filed: Apr. 1, 1996

Related U.S. Application Data

[63] Continuation of Ser. No. 204,529, Mar. 1, 1994, abandoned.

[51] Int. Cl.⁶ .................................................. G06F 3/14
[52] U.S. Cl. .......................... 395/348; 395/326; 395/333
[58] Field of Search ............................... 395/326, 333, 395/334, 348, 349, 350, 351

[56] References Cited

U.S. PATENT DOCUMENTS

| | | | |
|---|---|---|---|
| 4,885,704 | 12/1989 | Takagi et al. | 364/521 |
| 5,060,135 | 10/1991 | Levine et al. | 364/200 |
| 5,072,412 | 12/1991 | Henderson, Jr. et al. | 395/159 |
| 5,140,677 | 8/1992 | Fleming et al. | 395/159 |
| 5,345,550 | 9/1994 | Bloomfield | 395/156 |
| 5,384,911 | 1/1995 | Bloomfield | 395/157 |

FOREIGN PATENT DOCUMENTS

WP93/22738  11/1993  WIPO .................. G06F 15/62

OTHER PUBLICATIONS

"Windowless Icon Grouping," IBM® Technical Disclosure Bulletin, vol. 37, No. 02B, Feb. 1994, pp. 87–88.

*Primary Examiner*—Thomas G. Black
*Assistant Examiner*—Ruay Lian Ho
*Attorney, Agent, or Firm*—Seed and Berry LLP

[57] ABSTRACT

File rack icons are provided to logically group object icons on the screen of a video display. The file rack icon consolidates the grouped icons so that they occupy less of the screen of the video display. The file rack icon is available in alternative forms. In addition, object icons may be dragged into or dragged out of a file rack icon so as to dynamically alter the icons grouped by the file rack icon.

15 Claims, 2 Drawing Sheets

FOLDER RACK ICONS

CROSS-REFERENCE TO RELATED APPLICATION

This application is a continuation of U.S. patent application Ser. No. 08/204,529, filed Mar. 1, 1994, now abandoned.

TECHNICAL FIELD

The present invention relates generally to processing systems and, more particularly, to the use of folder rack icons within a data processing system.

BACKGROUND OF THE INVENTION

A number of conventional data processing systems utilize "folders." A folder is a container for logically grouping documents and files. Each folder typically has a folder icon associated with it. Such folder icons are often displayed on a video desktop shown on a video display. The video desktop is an on-screen work area. Typically, a desktop displays a number of opened windows and icons, including folder icons. A mechanism is provided for a user to manipulate the folder icon so as to open the folder and make visible what files and documents are stored therein.

Although the folder icons are useful to display what documents and files are available to a user, many users often have a large number of folder icons on their desktops at any point in time. Each folder icon is displayed separately and spaced relative to other folder icons. As a result, the folder icons may occupy a very large percentage of the available space on the screen of the video display.

SUMMARY OF THE INVENTION

The present invention overcomes the limitation of the prior art wherein the folder object icons occupy a disproportionately large percentage of the screen of a video display. In accordance with a first aspect of the present invention, a method is practiced in a data processing system having a video display and files organized into folders. Icons are provided for the folders and a file rack icon is provided. The file rack icon displays a representation of a group of the folders on the video display in a fashion that occupies less of the video display and displaying the icons of the folders in the group of folders. The file rack icon is displayed on the video display.

In accordance with another aspect of the present invention, at least one folder for grouping files is provided within the data processing system. The folder has an associated icon and is visible in a name space provided in the data processing system. A logical file rack structure is provided for logical grouping folders. The logical file rack structure includes the provided folder. An icon that differs from the icon of the provided folder is displayed for the logical file rack structure on the video display without separately displaying the icon for the folder.

In accordance with a still further aspect of the present invention, a data processing system includes a video display and a file system for storing and managing files. The file system provides a name space for files and folders and group files. A tool for displaying folder icons for the folders is provided, along with the tool for displaying a file rack icon on the video display. The file rack icon provides a representation of a group of folders in the video display that occupies less of the video display, then displaying all of the folder icons in the group folders.

It should be appreciated in the different aspects of the present invention that the file rack icon need not only group folder racks, but rather may generally group different types of objects, including objects representing the contents of a video desktop.

DETAILED DESCRIPTION OF THE INVENTION

The preferred embodiment of the present invention provides a file rack icon that represents a number of logically grouped icons in a fashion that occupies less of the screen of a video display than the grouped icons would occupy if displayed separately. The icons grouped into the file rack icon may be folders, video desktops, or other icons associated with objects. The preferred embodiment of the present invention provides two alternative file rack icons that may be selected by a user or program. The file rack icons help to free space on the screen of a video desktop so that other information may be displayed.

Figure 1:
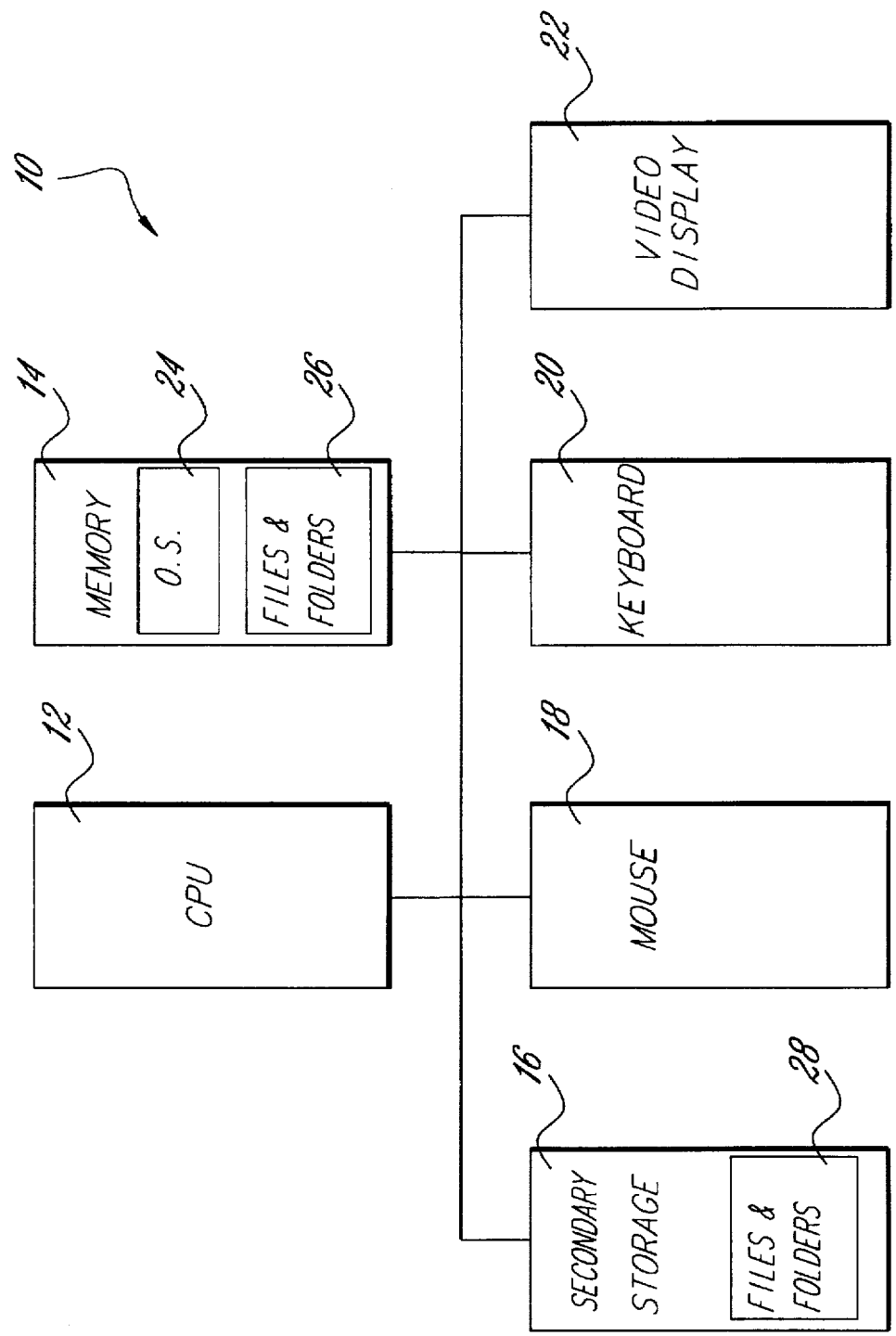
FIG. 1 is a block diagram of a data processing system suitable for practicing a preferred embodiment of the present invention.

FIG. 1 is a block diagram of the data processing system 10 that is suitable for practicing the preferred embodiment of the present invention. The data processing system 10 includes a central processing unit (CPU) 12 and a memory 14 (such as a hard disk or RAM). In addition, the data processing system 10 includes a secondary storage device 16 (such as a disk drive), a mouse 18, a keyboard 20, and a video display 22. Those skilled in the art will appreciated that the data processing system 10 shown in FIG. 1 is merely illustrative and that the present invention may be practiced in other data processing environments, including in distributed systems.

The preferred embodiment of the present invention is implemented as part of the operating system 24. The operating system provides the file rack icons for its own use and use by other application programs. The operating system 24 may be an object-oriented operating system that supports an underlying object model. For purposes of the discussion below, it will be assumed that the operating system 24 is an embellished version of the Microsoft Windows, Version 3.1, operating system, sold by Microsoft Corporation of Redmond, Washington. Nevertheless, it should be appreciated that other operating systems may be used to practice the present invention. The operating system 24 allows a user to predefine types of objects. In addition, the operating system 24 provides an ability to draw certain icons on a video display 22.

The memory 14 of the data processing system 10 holds a number of files and folders 26. As was discussed above, the folders are containers that logically group documents and files. Additional files and folders 28 are stored within the secondary storage 16. The operating system 24 provides a file system that includes a naming service. The naming service facilitates a name space of files and folders that identifies the files and folders 26 and 28 in memory 14 and secondary storage 16 that are available to users and applications within the data processing system 10. The file rack icon is a vehicle for grouping icons on the video display 28 so as to minimize the amount of display space occupied by object icons.

In order to understand how the preferred embodiment of the present invention operates, it is helpful to introduce a few concepts that are employed therein. A first such concept is the notion of an "object." An object is a logical structure that may combine attributes with behavior. From the programming perspective, an object may be viewed as a logical structure that combines data structures and may include functions that operate on the data structures. It should be appreciated, nevertheless, that an object may, in many instances, include only data structures and not include any functions.

Objects are organized into "classes". An object class is a group of objects with similar properties and common behavior. Each object is a member of a class that constitutes an instance of the object class. All members of a class include at least the properties defined for the object class, but the value of these properties may vary among the objects of the object class. As will be explained in more detail below, a file rack icon object class is defined and utilized by the preferred embodiment of the present invention.

The file rack icons provided by the preferred embodiment of the present invention have associated objects. To create a file rack icon, a user or an application program must instantiate an instance of the file rack icon object class. The file rack icon object holds information about the appearance of the file rack icon and about object icons that are grouped by the file rack icon. Such a file rack icon object may be created using the application program interfaces (APIs) provided by the operating system 24. Each folder rack icon object supports a number of slots which may be filled with object icons. In particular, a default number of empty slots are provided, but as a folder rack icon fills up, more slots are added. The folder rack icon shown on the video display 22 provides a visual indication of how many of its slots are filled. Visual indications may also be provided for the number of slots that are not filled.

Figure 2A:
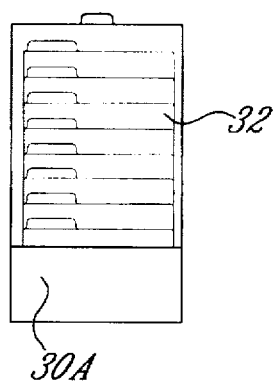
FIG. 2A is a depiction of a first file rack icon provided by the preferred embodiment of the present invention.

FIG. 2A illustrates a first embodiment of the file rack icon object 30A provided by the preferred embodiment of the present invention. The file rack icon 30A includes portions that are unique to the file rack icon but also includes other portions 32 that are associated with object icons that are grouped by the file rack icon. Thus, for example, the file tab labeled with reference number 32 in FIG. 2A is associated with a first folder icon. Similarly, the other file tabs shown in FIG. 2A are associated with other folder icons. As mentioned above, the file rack icon need not only hold folder icons but may also hold other types of object icons.

Figure 2B:
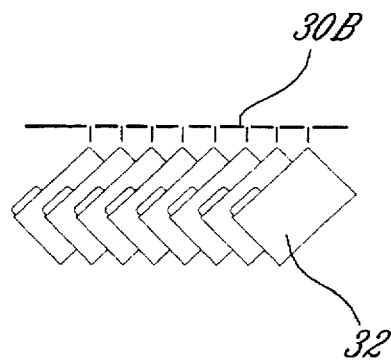
FIG. 2B is a second embodiment of a file rack icon that is provided by the preferred embodiment of the present invention.

FIG. 2B shows another file rack icon 30B provided by the preferred embodiment of the present invention that is an alternative to the file rack icon 30A shown in FIG. 2A. In the file rack icon object 30B of FIG. 2B, each of the folder icons 32 is diagonally hung from a hook. When the user creates a file rack icon, the user must specify which of the file rack icons 30A and 30B he desires. Functionally, the file rack icons 30A and 30B operate in the same fashion. They differ only as to appearance.

When creating file rack icons 30A and 30B, a user or program has the option of specifying what icons are to be included therein. The user or program also has the option of dynamically altering the contents of the folder rack icons 30A and 30B after they have been created. In particular, a user may drag object icons into the folder rack icon 30A and 30B so as to add the object icon or may, conversely, drag an object icon out of a folder rack icon, to remove the object icon.

Before discussing the dragging and dropping of object icons relative to file rack icons, a brief discussion of the role of messages in drag-and-drop operations is helpful. Each window shown on the video display 22 has a window procedure that is associated with it. Input devices, such as mouse 18, communicate with an application run on the CPU 12 via messages. Thus, when a user depresses a button on a mouse, a mouse message is sent to the window procedure for the window where a screen cursor currently points on the video display 22. Similarly, when the mouse 18 is moved, messages are sent to the window procedures where the screen cursor is positioned to indicate the movement of the mouse.

Figure 3:
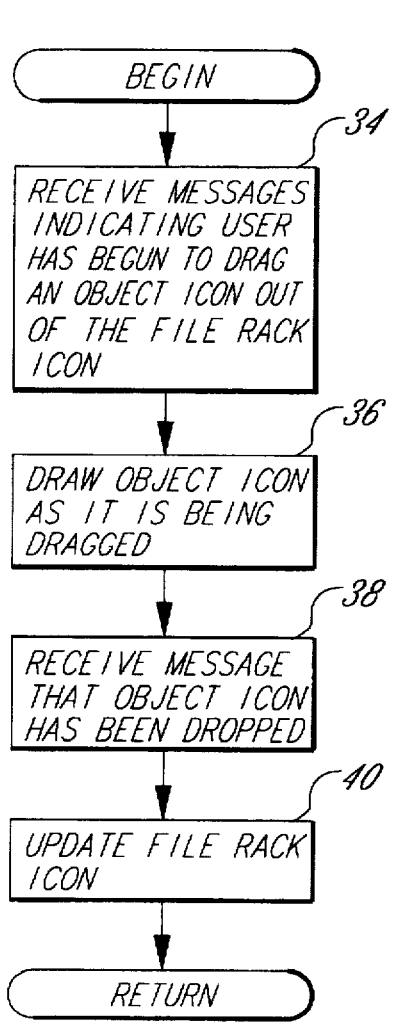
FIG. 3 is a flowchart illustrating the steps performed in the preferred embodiment of the present invention when an object icon is dragged out of the file rack icon.

FIG. 3 is a flowchart illustrating the steps performed when a user drags an object icon out of a file rack icons 30A or 30B. Initially, the user positions the screen cursor over the portion of the file rack icon 30A or 30B that is associated with a target object icon. The user then initiates the drag-and-drop operation by depressing a designated one of the mouse buttons and moving the mouse 18 so as to drag the object icon across the video display 22. The window procedure for the window that displays the file rack icon 30A or 30B receives messages indicating that the user has begun to drag the object icon out of the file rack icon (step 34 in FIG. 3). In particular, messages are received which indicate that the mouse button has been depressed and the mouse 18 has moved more than a threshold minimum amount while the mouse button has been depressed. As the user drags the object icon, the window routine tells the operating system 24 to draw the object icon on the video display 24 (step 36). The user then releases the mouse button when the object icon is positioned at its destination. The release of the mouse button causes the object icon to drop, and a message indicating that the user has released the mouse button is sent to the window routine (step 38). The file rack icon is then updated to indicate the removal of the object icon (step 40).

Figure 4:
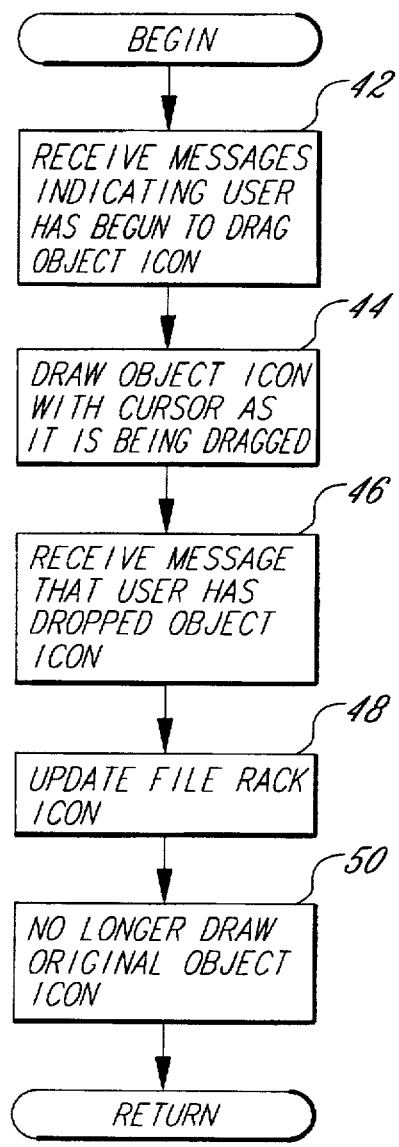
FIG. 4 is a flowchart illustrating the steps performed in the preferred embodiment of the present invention when an object icon is dragged into the file rack icon.

FIG. 4 is a flowchart illustrating the steps performed by the window routine during a drag-and-drop of an object icon into a file rack icon 30A or 30B. Initially, the user begins the drag-and-drop operation and messages are sent to the window routine indicating the beginning of a drag-and-drop operation (step 42). As the user drags the object icon, the window routine tells the operating system 24 to draw the object icon with the cursor at the appropriate location (step 44). When the user has moved the object icon over the file rack icon 30A or 30B, the user releases the mouse button to drop the object icon on the file rack object icon. The window routine receives a message that the user has dropped the object icon (step 46). The window routine updates the file rack icon 30A or 30B so as to reflect the additional object icon (step 48) and the original object icon is no longer drawn on the video display 24. It should be appreciated that steps 48 and 50 need not be performed in the order shown in FIG. 4.

While the present invention has been described with reference to a preferred embodiment thereof, those skilled in the art will, nevertheless, appreciate that various changes in form and detail may be made without departing from the spirit and scope of the present invention as defined in the appended claims.

We claim:

1. In a data processing system having a video display and files organized into folders, a method comprising the steps of:
    providing icons for the folders;
    providing a file rack icon that is visually different from the icons for the folders for displaying a representation of a group of the folders on the video display in a fashion that occupies less of the video display than displaying the icons of the folders in the group of folders, said file rack icon including a separate visual element for each of the folders of the group; and
    displaying the file rack icon on the video display.

2. The method of claim 1 wherein the data processing system further comprises an input device and wherein the method further comprises the step of using the input device to drag and drop a folder icon of a selected folder into the file rack icon so as to add the selected folder to the group of folders.

3. The method of claim 1 wherein the data processing system further comprises an input device and wherein the method further comprises the step of using the input device to drag a folder icon for a selected folder out of the file rack icon so as to remove the selected folders from the group of folders.

4. In a data processing system having a video display and a name space, a method comprising the steps of
    providing at least one folder for grouping files, said folder having an associated icon and said folder being visible in the name space;
    providing a logical file rack structure for logically grouping folders, said logical file rack structure including the provided folder; and
    displaying an icon for the logical file rack structure on the video display that differs from the icon associated with the provided folder without separately displaying the icon for the provided folder on the video display and that includes a separate visual element for each folder in the logical file structure.

5. The method of claim 4 wherein the step of providing at least one folder comprises providing multiple folders.

6. The method of claim 5 wherein the step of displaying the icon for the logical file rack structure displays the icon for the logical file rack structure such that the icon for the logical file rack structure occupies less of the video display than a sum of the space on the video display that is occupied by the folder icons that are grouped by the logical file rack structure.

7. The method of claim 4 wherein the data processing system includes an input device and wherein the method further comprises the step of using the input device to drag and drop a folder icon of a selected folder into the icon for the logical file rack structure so as to add the folder to the logical file rack structure.

8. The method of claim 4 wherein the data processing system includes an input device and wherein the method further comprises the step of using the input device to drag a folder icon for a selected folder out of the icon for the logical file rack structure so as to remove the selected folder from the logical file rack structure.

9. The method of claim 4 wherein at least one of the folders grouped in the logical file rack structure holds files for an application program.

10. A data processing system comprising:
    a video display;
    a file system for storing and managing files, said file system providing a name space of files and folders that group files;
    a tool for displaying folder icons on the video display of the folders; and
    a tool for displaying a file rack icon on the video display wherein said file rack icon providing a representation of a group of the folders on the video display that occupies less of the video display than displaying all of the folder icons of the group of folders on the video display and said file rack icon including a separate visual element for each folder in the group of folders.

11. The data processing system of claim 10, further comprising an input device for dragging a folder icon out of the file rack icon.

12. The data processing system of claim 10, further comprising an input device for dragging a folder icon into the file rack icon.

13. In a data processing system having a video display and a storage device holding objects, a method comprising the steps of:
    providing icons for the objects;
    providing a file rack icon for displaying a representation of a group of the objects on the video display in a fashion that occupies less of the video display than displaying the icons of the objects in the group of objects wherein said file rack icon includes a separate visual element for each object in the group; and
    displaying the file rack icon.

14. The method of claim 13 wherein each of the objects is associated with a virtual desktop that may be displayed on the video display.

15. A computer-readable storage medium holding code for:
    providing icons for the folders;
    providing a file rack icon that is visually different from the icons for the folders for displaying a representation of a group of the folders on a video display in a fashion that occupies less of a video display than displaying the icons of the folders in the group of folders, said file rack icon including a separate visual element for each of the folders of the group; and
    displaying the file rack icon on a video display.

* * * * *